United States Patent
Kahtava et al.

(10) Patent No.: US 10,440,722 B2
(45) Date of Patent: Oct. 8, 2019

(54) MOBILE COMMUNICATIONS NETWORK, METHODS, BASE STATION, RELAY NODE AND COMMUNICATIONS TERMINAL

(71) Applicant: Sony Corporation, Tokyo (JP)

(72) Inventors: Jussi Tapani Kahtava, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/552,716

(22) PCT Filed: Mar. 8, 2016

(86) PCT No.: PCT/EP2016/054928
§ 371 (c)(1),
(2) Date: Aug. 22, 2017

(87) PCT Pub. No.: WO2016/155990
PCT Pub. Date: Oct. 6, 2016

(65) Prior Publication Data
US 2018/0035437 A1    Feb. 1, 2018

(30) Foreign Application Priority Data
Mar. 31, 2015   (EP) ..................................... 15162010

(51) Int. Cl.
*H04W 72/08*      (2009.01)
*H04B 7/155*      (2006.01)
(Continued)

(52) U.S. Cl.
CPC .......... *H04W 72/085* (2013.01); *H04B 7/155* (2013.01); *H04B 7/15528* (2013.01);
(Continued)

(58) Field of Classification Search
CPC .................................................. H04W 72/085
See application file for complete search history.

(56) References Cited

U.S. PATENT DOCUMENTS 8,630,582 B2 *   1/2014   Nogueira-Nine ..... H04W 24/02
                                                         455/25
8,867,383 B2 *  10/2014   Frenger .............. H04B 7/15542
                                                        370/252
(Continued)

FOREIGN PATENT DOCUMENTS

EP         2448351 A1     5/2012

OTHER PUBLICATIONS

"Interference Detection and Measurement in OFDMA Relay Networks ; C80216j-07 _229", IEEE Draft; C80216J-07 _229, IEEE-SA, Piscataway, NJ USA, vol. 802.16j, Mar. 5, 2007 (Mar. 5, 2007), pp. 1-12 (Year: 2007).*

(Continued)

*Primary Examiner* — Parth Patel
(74) *Attorney, Agent, or Firm* — Xsensus LLP (57) ABSTRACT

A base station receives measurement information from infrastructure units, and this measurement information in order to create a look-up table. Based on analysis of the measurement information, an indication of connections between a relay node and communications terminals in the network is transmitted, and communications resources are assigned to each of the infrastructure units in the network. The relay node in the network transmits channel sounding signals to be measured by other infrastructure units, in their assigned communications resource, and with a specified transmission power. The infrastructure units which detect the channel sounding signals can then use them to measure and estimate a state of the channel and determine which frequency resources to use when scheduling transmissions.

17 Claims, 7 Drawing Sheets

(51) Int. Cl.
   *H04W 16/26* (2009.01)
   *H04W 84/04* (2009.01)
   *H04W 72/04* (2009.01)
(52) U.S. Cl.
   CPC ........ *H04W 16/26* (2013.01); *H04W 72/0446* (2013.01); *H04W 72/0473* (2013.01); *H04W 84/047* (2013.01)

(56) References Cited

U.S. PATENT DOCUMENTS

| | | | | |
|---|---|---|---|---|
| 8,917,583 | B2* | 12/2014 | Levy | H04W 72/042 370/203 |
| 9,635,673 | B2* | 4/2017 | Webb | H04W 72/121 |
| 10,015,705 | B2* | 7/2018 | Xu | H04W 24/10 |
| 2008/0219365 | A1* | 9/2008 | Viorel | H04L 5/0048 375/260 |
| 2010/0167743 | A1* | 7/2010 | Palanki | H04B 7/155 455/436 |
| 2010/0322145 | A1* | 12/2010 | Yu | H04B 7/155 370/315 |
| 2011/0151773 | A1* | 6/2011 | Okuda | H04B 7/2606 455/9 |
| 2012/0008589 | A1* | 1/2012 | Iwai | H04B 1/713 370/329 |
| 2012/0170481 | A1* | 7/2012 | Kimura | H04B 7/15542 370/252 |
| 2013/0034045 | A1* | 2/2013 | Kwon | H04L 41/12 370/315 |
| 2013/0051254 | A1* | 2/2013 | Wilhelmsson | H04W 72/1215 370/252 |
| 2013/0215820 | A1* | 8/2013 | Redana | H04W 16/26 370/315 |
| 2013/0225166 | A1* | 8/2013 | Akhtar | H04W 24/02 455/435.1 |
| 2013/0279364 | A1* | 10/2013 | Nagata | H04B 7/155 370/252 |
| 2013/0294381 | A1* | 11/2013 | Wang | H04L 5/0051 370/329 |
| 2013/0336199 | A1* | 12/2013 | Schwartz | H04B 7/15507 370/315 |
| 2015/0016335 | A1 | 1/2015 | Yu et al. | |
| 2015/0031284 | A1* | 1/2015 | Pitakdumrongkija | H04W 16/26 455/9 |
| 2015/0156165 | A1* | 6/2015 | Lindoff | H04W 8/005 370/329 |
| 2015/0270941 | A1 | 9/2015 | Iwai et al. | |
| 2016/0028523 | A1 | 1/2016 | Iwai et al. | |
| 2016/0128066 | A1* | 5/2016 | Park | H04W 16/14 370/329 |
| 2016/0198461 | A1* | 7/2016 | Su | H04W 72/0446 370/329 |
| 2016/0286374 | A1* | 9/2016 | Baghel | H04W 76/14 |
| 2017/0134976 | A1* | 5/2017 | Uchino | H04W 16/32 |
| 2017/0318586 | A1* | 11/2017 | Wang | H04W 72/0453 |
| 2017/0374575 | A1* | 12/2017 | Kahtava | H04W 48/16 |
| 2018/0054248 | A1* | 2/2018 | Kahtava | H04B 7/15 |
| 2019/0014490 | A1* | 1/2019 | Kim | H04W 24/02 |

OTHER PUBLICATIONS

International Search Report dated May 31, 2016, in PCT/EP2016/054928, filed Mar. 8, 2016.
"3rd Generation Partnership Project; Technical Specification Group Radio Access Network; Small cell enhancements for E-UTRA and E-UTRAN—Physical layer aspects (Release 12)". 3GPP TR 36.782 V 12.1.0, Dec. 2013, 100 pages.
Holma et al.. "LTE for UMTS OFDMA and SC-FDMA Based Radio Access", Jan. 2010, 4 pages.
"3rd Generation Partnership Project; Technical Specification Group Radio Access Networks; LTE Device to Device Proximity Services; User Equipment (UE) radio transmission and reception; (Release 12)", 3GPP TR 36.877 V1.0.0, Dec. 2014, 153 pages.
Chen et al., "Interference Detection and Measurement in OFDMA Relay Networks" IEEE 802.16 Boradband Wireless Access Working Group, Mar. 5, 2007, 12 pages, XP 017630083.
"3rd Generation Partnership Project; Technical Specification Group Radio Access Network: Study on LTE Device to Device Proximity Services; Radio Aspects (Release 12)", 3GPP TR 36.843 V12.0.1, Mar. 2014, 50 pages.

* cited by examiner

MOBILE COMMUNICATIONS NETWORK, METHODS, BASE STATION, RELAY NODE AND COMMUNICATIONS TERMINAL

CROSS-REFERENCE TO RELATED APPLICATIONS

The present application claims priority to European Patent Application 15162010.1, filed in the European Patent Office on Mar. 31, 2015, the entire contents of which are incorporated herein by reference.

TECHNICAL FIELD OF THE DISCLOSURE

The present disclosure relates to mobile communications networks, methods, base stations, relay nodes and communications terminals, and more specifically to providing an arrangement in which one or more relay nodes transmit channel sounding signals in assigned communications resources in order to measure a channel quality across a frequency spectrum between the relay nodes and communications terminals.

Embodiments of the present technique can provide methods of communicating data in a small cell environment where relay nodes may be used.

BACKGROUND OF THE DISCLOSURE

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a number of new infrastructure architectures involving a variety of classes of devices, of wireless access point units and of applications which may require different data rates, coverage areas or transmission powers. Unlike a conventional third or fourth generation communications device such as a smartphone, an MTC-type terminal is preferably relatively simple and inexpensive, having a reduced capability. Examples of recent developments include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on. Other examples include relay nodes which provide assistance to local terminal communicating with a base station.

Whilst it can be convenient to have different systems addressing different needs from different mobile network users, the additions of new infrastructure and new services can also create an infrastructure problem, which is not desirable in a mobile network.

With the continuous growth in data transmitted in mobile networks, continually increasing network capacity comparatively is a problem faced by the industry. There are three parameters which can be changed in order to increase Radio Access network capacity: higher spectral efficiency, more radio spectrum and denser cell layout. The two former of these have limitations on the expected gains over today's LTE, and certainly improvements on the order of magnitude or more are not possible. Thus, in order to meet the stated 1000× capacity targets, small cells are getting a lot of attention [1].

In wideband wireless systems the bandwidth across which transmissions are scheduled is much wider than the coherence bandwidth of the physical medium. This means that the channel state may be very different in two or more sub-bands of the wideband operational bandwidth. For this purpose, when transmission are scheduled over wideband wireless systems some prior information on the channel state in frequency domain is necessary.

An objective technical problem addressed by the present disclosure, then, is to reduce latency and increase efficiency in a mobile communications network where the radio channel between infrastructure units may be very wide. This may be achieved through the employment of small cells and relay nodes, with the relay nodes able to estimate a state of the channel. This in itself has its own set of challenges to overcome.

SUMMARY OF THE DISCLOSURE

According to an example embodiment of the present disclosure there is provided a mobile communications network comprising a base station, one or more relay nodes, and one or more communications terminals. The base station comprises a transmitter configured to transmit signals with accordance with a wireless access interface to the one or more communications terminals, and to transmit signals via the wireless access interface to the one or more relay nodes, and a receiver configured to receive signals via the wireless access interface from the one or more communications terminals, and to receive signals via the wireless access interface from the one or more relay nodes. The mobile communications network comprises a controller, configured in combination with the receiver to receive measurement information from the one or more relay nodes and from the one or more communications terminals, to identify from an analysis of the measurement information connections between any two of the one or more relay nodes and the one or more communications terminals, in accordance with a quality of radio communications between the one or more relay nodes and the one or more communications terminals represented by the measurement information, and to assign communications resources for each of the one or more relay nodes, in which each of the one or more relay nodes is configured to transmit a channel sounding signal. The controller is configured in combination with the transmitter to transmit the indication of the connections between the one or more relay nodes and the one or more communications terminals to each of the one or more relay nodes, and to transmit to each of the one or more relay nodes the assigned communications resources for each of the one or more relay nodes to transmit the channel sounding signal, and to transmit to each of the one or more communications terminals the assigned communications resources for each of the one or more relay nodes to transmit the channel sounding signal. Accordingly the relay nodes may be arranged to transmit channel sounding signals so that communications terminals performing device to device communications can estimate the radio channel.

A problem arising from an application of device to device (D2D) communications is that a radio channel between a communications terminal and a relay node or between relay nodes may be very wide. It would be preferable for the transmitting relay node to transmit signals in a part of the radio channel that has best radio communications conditions with respect to possible fading. Relay synchronisation signals may only cover a middle part of the radio channel, and do not provide any channel state information over other parts of the radio channel. When signals representing data packets are sent between D2D communications channels, demodulation reference symbols assist in channel estimation and demodulation of the signals to detect the data packet, but they do not provide information on any other parts of the radio channel. Relay synchronisation signals do not provide any way of a priori establishment of the channel state for scheduling purposes, which is achieved for LTE uplink transmissions by communications terminals transmitting sounding reference symbols (SRS).

Accordingly, the present disclosure can provide an arrangement for implementing channel sounding in D2D communications between two communicating terminals. The present disclosure makes it possible for D2D devices to send transport blocks in D2D resources that have good channel state characteristics. Scheduling transmissions to frequency resources with a better channel state reduces the number of failed transmissions, retransmissions (if used) and thus improves overall latency across the D2D connections.

The present disclosure provides a network configuration in which an ad-hoc network is formed with reference to incoming edges, which are the infrastructure units from which communications may be received, and outgoing edges, which are the infrastructure units to which communications may be transmitted for each infrastructure unit in the network. Here infrastructure units can be a relay node or a communications terminal acting as a relay node. Using a transmitted indication of the incoming edges and outgoing edges, and an allocation of communications resources by controller for transmitting channel sounding signals (also known as sounding reference symbols), the D2D devices in the ad-hoc network know exactly when to transmit sounding reference symbols, and exactly when to measure sounding reference symbols transmitted by other devices.

Various further aspects and features of the present technique are defined in the appended claims, which include a mobile communications network comprising a base station, one or more relay nodes and one or more communications terminals, a method of operating a base station as a network controller, a base station forming part of a mobile communications network, circuitry for a base station forming part of a mobile communications network, a relay node forming part of a mobile communications network, circuitry for a relay node forming part of a mobile communications network, a communications terminal forming part of a mobile communications network, and circuitry for a communications terminal forming part of a mobile communications network.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Hereinafter preferred embodiments of the present technique will be described in detail with reference to the appended drawings. Note that, in this specification and appended drawings, structural elements that have substantially the same function and structure are denoted with the same reference numerals, and repeated explanation of these structural elements is omitted.

Figure 1:
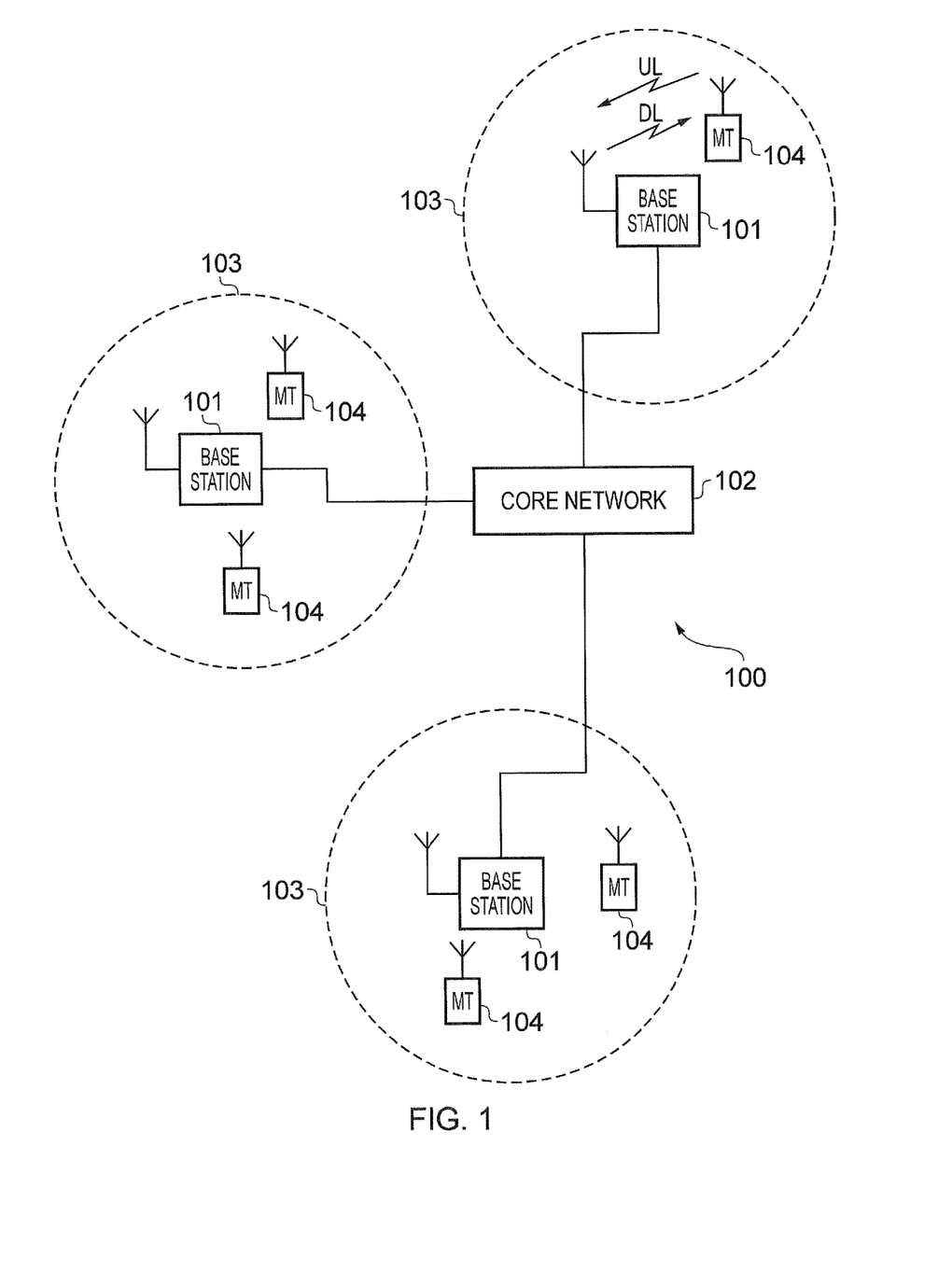
FIG. 1 provides a schematic diagram of a mobile communications system according to an example of an LTE standard.

FIG. 1 provides a schematic diagram illustrating some basic functionality of a conventional mobile telecommunications network, using for example a 3GPP defined UMTS and/or Long Term Evolution (LTE) architecture. The mobile telecommunications network/system 100 of FIG. 1 operates in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [2]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that are licensed for use by the operator of the network 100. The core network 102 routes data to and from the terminal devices 104 via the respective base stations 101 and provides functions such as authentication, mobility management, charging and so on. The terminal devices may also be referred to as mobile stations, user equipment (UE), user terminal, mobile terminal, mobile device, terminal, mobile radio, and so forth. Base stations may also be referred to as transceiver stations/nodeBs/e-nodeBs/eNodeB, and so forth.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

The base stations 101 of FIG. 1 may be realised as any type of evolved Node B (eNodeB) such as a macro eNodeB and a small eNodeB. The small eNodeB may be an eNodeB such as a pico eNodeB, a micro eNodeB, and a home (femto) eNodeB that covers a cell smaller than a macro cell. Instead, the base station 101 may be realized as any other types of base stations such as a NodeB and a base transceiver station (BTS). The base station 101 may include a main body (that is also referred to as a base station apparatus) configured to control radio communication, and one or more remote radio heads (RRH) disposed in a different place from the main body. In addition, various types of terminals, which will be described below, may each operate as the base station 101 by temporarily or semi-persistently executing a base station function.

Any of the communications devices 104 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The communications device 104 may also be realized as a terminal (that is also referred to as a machine type communication (MTC) terminal) that performs machine-to-machine (M2M) communication. Furthermore, the terminal apparatus 104 may be a radio communication module (such as an integrated circuit module including a single die) mounted on each of the terminals.

In the present disclosure, a base station providing a small cell is generally differentiated from a conventional base station mostly (and sometimes exclusively) in the range provided by the base station. Small cells include for example the cells also called femtocell, picocell or microcell. In other words, small cells can be considered as similar to macrocells in the channels and features provided to the terminals, but with the use of less power for base station transmissions, which results in a smaller range. A small can therefore be the cell or coverage provided by a small cell base station. In other examples, the term small cell can also refer to a component carrier when more than one component carrier is available.

Figure 2:
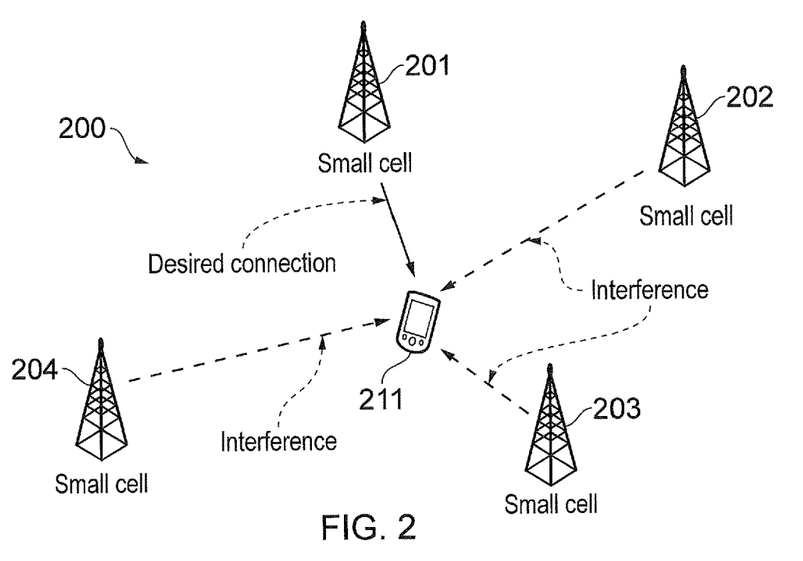
FIG. 2 schematically illustrates an example of a small cell environment.

FIG. 2 illustrates an example of a small cell environment 200 wherein a plurality of base stations 201 to 204 are operable to communicate with terminals, such as terminal 211. In this example, the terminal 211 is in communication with base station 201 providing a first small cell but is within the range of the small cell for each of base stations 202, 203 and 204. As a result, the signals sent by base station 201 to terminal 211 can suffer from interference from signals transmitted by base stations 202 to 204. While with conventional macrocell networks the same type of situation would also be likely, in practice, the mobile operator is in a position to carry out frequency planning, distributing frequencies amongst base stations in a static or dynamic manner. Accordingly, the level of interference can be significantly reduced for macrocells. On the other hand, when dealing with a small cell network, there may be a potentially very large number of base stations, each using different powers such that network planning becomes much more difficult, and the complexity also increases with the number of active small cells in an area. In particular, if a large number or small cells are available in an area, it is likely that they will not be able to each be allocated a different, non-overlapping frequency bands such that transmissions from different cells would not interfere with each other. Moreover, small cell networks have the additional difficulty that a small cell may be mobile, i.e. not stationary, while network planning for a macrocell or legacy femto/picocells was generally based on stationary or fixed base stations. This also increases the complexity of trying to reduce interference significantly. Of course, interference between small cells can be significant when the number of deployed small cells increases such that in a dense small cell environment, interference reduction can be challenging. As a result, in the event that the interference affects synchronization signals or reference signals of small cells, terminals may not even be able to discover and connect to small cells.

Figure 3:
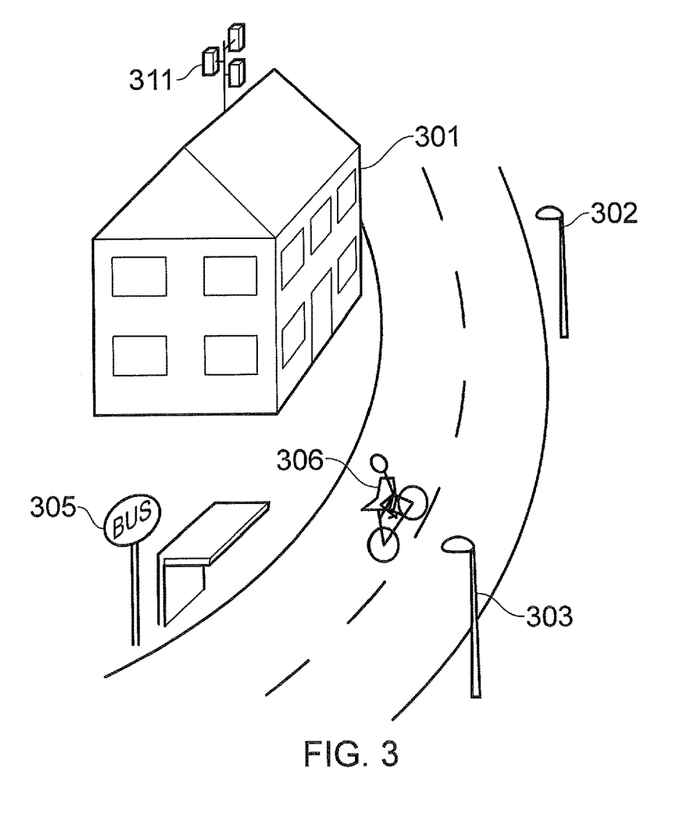
FIG. 3 illustrates another example of a small cell environment.

An example of a small cell environment 300 is illustrated in FIG. 3, where a macrocell base station 311 is provided in the same area as small cells provided by a base station 301 in or in the vicinity of a building, by a base station 302 in a first lamppost, by a base station 303 in a second lamppost, by a base station 305 provided in a bus stop and by a mobile base station 306 provided in a cyclist back-pack. In this example, the planning for interference may vary depending on traffic and on time. For example a cyclist may enter an interference zone this zone. However, the base station 301, if serving an office, may potentially only be used during office hours and may be turned off during the rest of the day or the rest of the week. A variety of base stations may thus be providing a small or macro cell and the base station may have very different profile regarding time of use, frequency capabilities, power/range, additional functionalities, etc.

Figure 4:
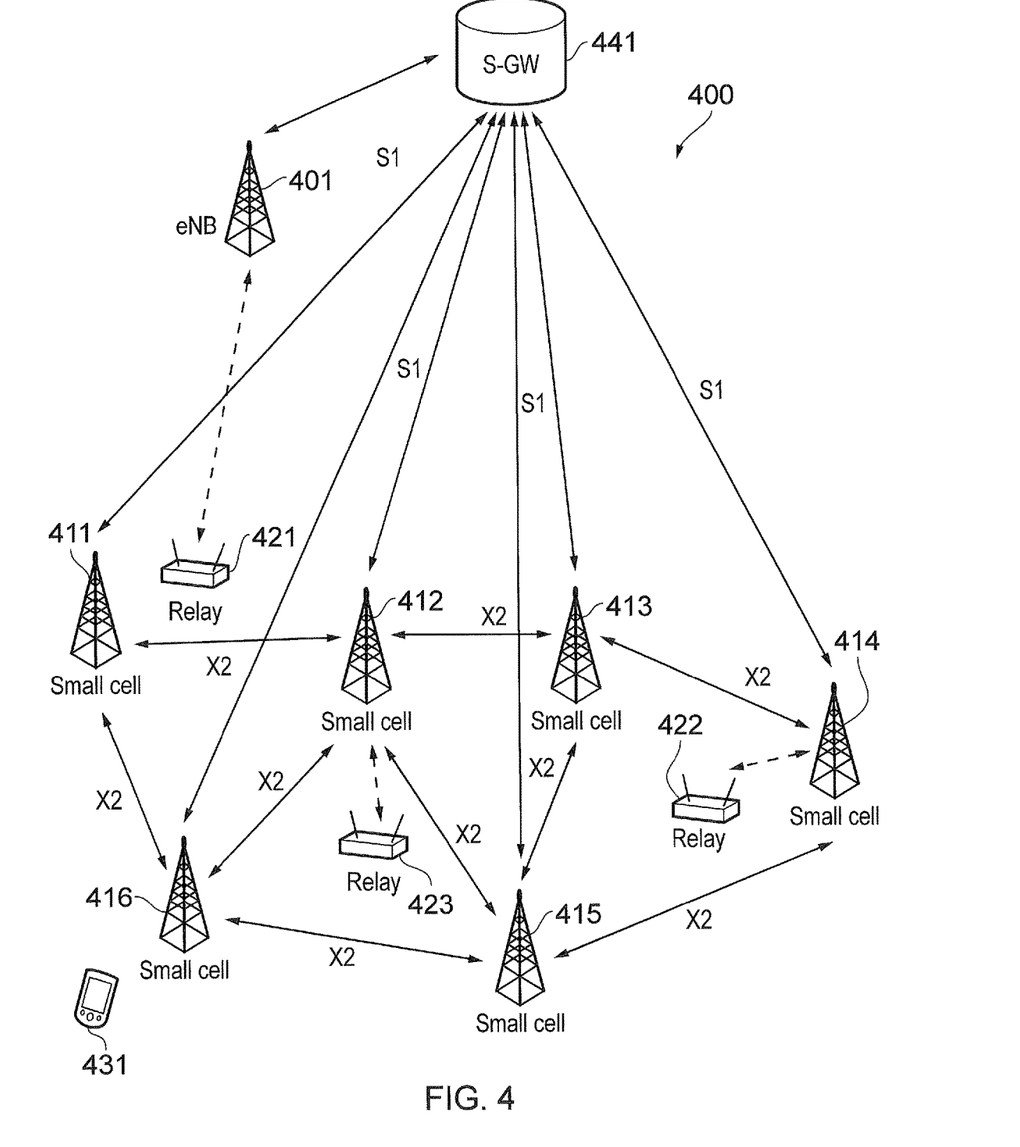
FIG. 4 illustrates an example system for communicating with at least a terminal in a heterogeneous network.

Moreover, mobile networks can also include relay nodes which can further increase the complexity of the mobile system and of the reduction of interference in a small cell network. FIG. 4 illustrates an example system 400 for communicating with at least a terminal 431. In this system 400, a base station 401 provides a macrocell and six base stations 411 to 416 provide small cell coverage, potentially overlapping with the coverage of the base station 401. Additionally, three relay nodes 421 to 423 are provided and are operating with base stations 401, 414 and 412, respectively. A relay node can generally be defined as a wireless radio access point for relaying transmission and which thus does not implement all of the functionalities of a base station. It is in general not directly connected to the core network but uses wireless access (inband or outband) for backhaul link to connect with a base station. In other examples, a backhaul link may also be provided over a wired connection. This is in contrast to a small cell base station which, as mentioned above, can generally operate like a base station and is thus connected to the core network, as illustrated by the arrows between the small cell base stations 411 to 416 and the Serving Gateway "S-GW" in FIG. 4. Relay nodes may also send or receive data with the terminals or base stations, forming an ad-hoc network which can also add to the complexity of dealing with interference in an environment as illustrated in FIG. 4.

Relay technologies are known generally to provide an arrangement for receiving signals from a base station and for retransmitting the received signals to a user equipment (UE, a communications terminal) in a mobile communications network, or to receive signals transmitted from a UE for re-transmission to a base station of a mobile communications network. The aim of such relay nodes is to try to extend a radio coverage area provided by a mobile communications network to reach communications devices which would otherwise be out of range of the mobile communications network or to improve the ratio of successful transmissions between a terminal and a base station.

The LTE specifications provide for two kinds of reference signals in the uplink between a UE and an eNodeB. The demodulation reference signals are used for channel estimation, to allow for coherent demodulation of uplink physical channels, such as physical uplink shared channels (PUSCH) and physical uplink control channels (PUCCH). This demodulation reference signal is transmitted together with, and covering the same frequency band as, the uplink physical channel that it is attached to. Consequently, the eNodeB gains information on the uplink channel quality for that particular UE only for the frequency resources used by the physical channel.

In order to estimate the uplink channel state at different frequencies, encompassing all of the potential frequency bands that the UE could be transmitting upon, the UE transmits sounding reference signals (SRS, or channel sounding signals) to allow the eNodeB to carry out these channel state measurements. These channel state estimates can then be used by the eNodeB scheduler to assign uplink resource blocks that have a good quality for PUSCH transmissions from the UE. Due to this need to cover much wider frequency resources than actual PUSCH and PUCCH transmissions, the SRS is not necessarily transmitted together with any physical channel, and typically covers a different and wider frequency span.

The LTE specifications define two types of sounding reference symbol transmissions in uplink. These are periodic SRS transmissions, and aperiodic SRS transmissions. Periodic SRS transmissions occur at regular time intervals, from every 2 ms up to every 160 ms. In the frequency domain, the SRS should cover the whole frequency band that may be assigned by the eNodeB scheduler. This may be done by either employing a sufficiently wide SRS transmission that allows for the sounding of the entire frequency band of interest with a single SRS transmission, or more narrowband SRS transmissions that hop across the frequency domain, such that a sequence of consecutive transmissions cover the entire frequency band of interest. Aperiodic SRS transmissions are triggered by signalling on PDCCH as a part of the scheduling grant to a UE. The time instants of aperiodic SRS are configured for each UE with higher-layer signalling.

Several UEs can be multiplexed to simultaneously transmit SRS through the use of different phase rotations for the SRS symbols, and/or through frequency multiplexing, since the SRS pattern only uses every other subcarrier.

The focus area for device-to-device (D2D) communications in 3GPP LTE Release 12 work is public safety, which is the only service that would do communications across the D2D link. For other uses, only the D2D discovery feature is considered.

Evolved universal mobile telecommunications system (UMTS) terrestrial radio access (E-UTRA) D2D is designed to operate in the uplink spectrum of the corresponding E-UTRA operating band, defined below in Table I.

TABLE I

E-UTRA packet switched D2D operating bands (3GPP TR36.877)

| E-UTRA Operating Band | Uplink (UL) operating band (base station receives, UE transmits) $F_{UL\_low}$ (MHz)-$F_{UL\_high}$ (MHz) | Downlink (DL) operating band (UE receives, base station transmits) $F_{DL\_low}$ (MHz)-$F_{DL\_high}$ (MHz) | Duplex mode | D2D Mode Disc. | Comm. |
|---|---|---|---|---|---|
| 2 | 1850-1980 | 1930-1990 | HD-FDD | [Yes] | |
| 3 | 1710-1785 | 1805-1880 | HD-FDD | [Yes] | [Yes] |
| 4 | 1710-1755 | 2110-2155 | HD-FDD | [Yes] | |
| 7 | 2500-2570 | 2620-2690 | HD-FDD | [Yes] | [Yes] |
| 14 | 788-798 | 756-768 | HD-FDD | [Yes] | [Yes] |
| 20 | 832-862 | 791-821 | HD-FDD | [Yes] | [Yes] |
| 26 | 814-849 | 859-894 | HD-FDD | [Yes] | [Yes] |
| 28 | 703-748 | 758-803 | HD-FDD | [Yes] | [Yes] |
| 41 | 2496-2690 | 2496-2690 | TDD | [Yes] | |

E-UTRA supports both flexibility bandwidths smaller than 5 MHz (i.e. 1.4 MHz and 3 MHz) and scalable bandwidths of 5, 10, 15 and 20 MHz. Data is allocated to the UEs in terms of resource blocks (12 subcarriers, 180 kHz); one UE can be allocated integer multiples of one resource block in the frequency domain. In uplink, data is allocated in multiples of one resource block. Both D2D discovery and D2D communications assume a maximum signal bandwidth of two physical resource blocks (PRB).

Channel bandwidths defined in TR36.877 (replicated in Tables II and III) assume a 10 MHz allocation for both uplink and downlink for frequency-division duplexing (FDD) and 20 MHz for time-division duplexing (TDD) for both the general and public safety scenarios [3]. It is proposed to prioritize 10 MHz channel bandwidth for D2D communications, and also that all existing channel bandwidths per E-UTRA band be baseline for D2D discovery.

TABLE II

E-UTRA band/D2D_discovery channel bandwidth

| E-UTRA Band | 1.4 MHz | 3 MHz | 5 MHz | 10 MHz | 15 MHz | 20 MHz |
|---|---|---|---|---|---|---|
| [ ] | | | [Yes]* | [Yes]* | [Yes]* | [Yes]* |

NOTE*:
If currently supported for the E-UTRA band.

TABLE III

E-UTRA band/D2D_communications channel bandwidth

| E-UTRA Band | 1.4 MHz | 3 MHz | 5 MHz | 10 MHz | 15 MHz | 20 MHz |
|---|---|---|---|---|---|---|
| [ ] | | | | [Yes] | | |
| [31] | | | [Yes] | | | |

In the context of the current work on D2D in 3GPP, the D2D discovery signal (D2DSS) covers the central part of the communications channel bandwidth, similarly to LTE synchronisation signal today. The D2D payload carries demodulation reference symbols (DMRS) to help the receiver to recover the transmitted information, but DMRS is clearly limited to the bandwidth of the actually transmitted D2D message. As stated above, the maximum bandwidth for D2D communications currently in 3GPP standards is 2 PRBs, i.e. 360 kHz.

The existing LTE specifications have sounding reference symbols that the UE transmits in uplink communications. In this case, it is the receiver (the base station) that reads the channel state from the SRS, and schedules the transmitter to transmit in parts of the uplink channel having a good channel state. This approach is opposite to what is taught by the present technique, where it is the transmitter that reads the SRS from the receiver, and then the transmitter independently decides which part of the resource assigned for D2D transmission is to be used for sending a signal towards the receiver.

U.S. Pat. No. 8,917,583 describes a method where a transmitter sends a signal requesting a channel sounding response signal from a receiver. The transmitter then measures the channel from the channel sounding response and transmits towards the receiver. This approach would quickly become unmanageable in dense relay networks where multiple relays are transmitting towards one receiver. Embodiments of the present disclosure do not make the transmitter responsible for requesting channel sounding responses, but instead make all the transmitters aware of when they can measure channel sounding signals relevant to them. The overall coordination managed by the network under which all the relay nodes camp is an advantage provided by the current invention.

Channel Sounding in D2D Links

According to an aspect of the present disclosure there is provided a base station comprising a controller, which may receive measurement information from one or more relay nodes and one or more communications terminals which it serves in a mobile communications network. The controller then transmits, based on analysis of the measurement information, an indication of connections between any two of the relay nodes and the communications terminals in the network, as well as assigned communications resources to each of the infrastructure units in the network. In one example, the indication of the connections between relay nodes is provided as a look-up table. The relay nodes in the network then transmit channel sounding signals to all other infrastructure units they have connections with as indicated by the controller, in their assigned communications resource, and with a specified transmission power, which is equal to the largest path loss between the relay node and any other infrastructure unit it is linked to. The infrastructure units which receive the channel sounding signals are then able to use them to estimate a state of the channel, and as such, determine which frequency resources to use when scheduling transmissions.

If the controller determines that based on analysis of the measurement information there are no connections to be established between one relay node and any other relay node or one relay node and any communications terminal, the relay node does not need to transmit channel sounding signals. In this case, the controller will assign no communications resources for this purpose to the relay node.

Figure 5:
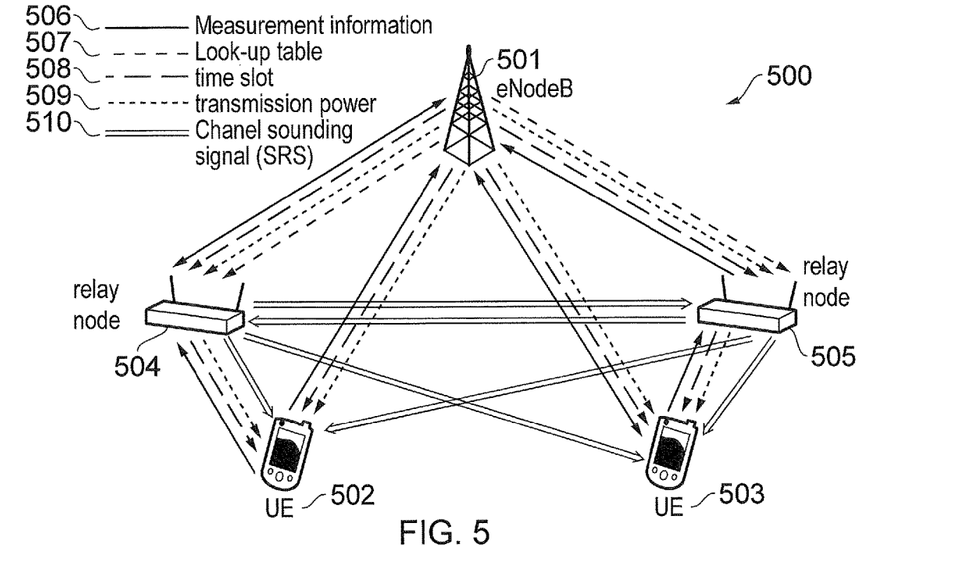
FIG. 5 illustrates an example mobile communications network in accordance with the present technique.

FIG. 5 illustrates a mobile communications network 500 in accordance with an arrangement of the present disclosure.

The network comprises an eNodeB 501, which may serve as the network controller, two mobile communications terminal, or UEs 502 and 503, and two relay nodes 504 and 505, all of which are served by the eNodeB 501. The eNodeB 501 comprises a transmitter configured to transmit data across a wireless access interface to the UEs 502 and 503 and the relay nodes 504 and 505, and a receiver configured to receive data from the UEs 502 and 503 and the relay nodes 504 and 505 in return. The eNodeB 501 is configured to receive measurement information, indicated by the solid arrows 506, from the UEs 502 and 503 and the relay nodes 504 and 505, and from analysis of this measurement information 506 to create a look-up table that establishes connections between the UEs 502 and 503 and the relay nodes 504 and 505.

The eNodeB 501 may receive the measurement information 506 from the UEs 502 and 503 via one or more of the relay nodes 504 and 505.

The eNodeB 501 is further configured to assign a time slot and a transmission power to each of the relay nodes 504 and 505, which are configured to be used when the relay nodes 504 and 505 transmit a channel sounding signal. The eNodeB 501 is configured to then transmit at least a part of the look-up table, indicated by the dashed arrows 507, to the relay nodes 504 and 505, the part of the look-up table 507 being transmitted to each of the relay nodes being relevant to that particular node. The eNodeB 501 is configured to then transmit a time slot, indicated by the longer dashed arrows 508, and a transmission power, indicated by the dotted arrows 509, to each of the UEs 502 and 503 and the relay nodes 504 and 505. The eNodeB 501 may transmit the time slot 508 and transmission power 509 to the UEs 502 and 503 via one or more of the relay nodes 504 and 505.

Finally, the relay nodes 504 and 505 are configured to transmit a channel sounding signal, indicated by the double arrows 510, which signal is measured by all or some of the other infrastructure units 502 to 505 in the mobile communications network 500.

The basic concept of the present technique is that relay nodes in turn transmit sounding reference symbols (SRS) across the bandwidth covered by the D2D resources, and relay nodes that are connected to the transmitting relay node, according to the look-up table incoming and outgoing edges, listen to the SRS and estimate where it would be most beneficial for them to schedule transmission towards the currently transmitting relay node. This may take place, for example, in a sequential fashion in coordination with the eNodeB, which assigns the SRS transmission occasions to relay nodes.

There may be multiple approaches on how the SRS transmission is triggered. The above mentioned periodic method takes place at given intervals and does not necessitate a specific trigger event to take place. In some other embodiments the transmission of SRS may be aperiodic, and initiated by a trigger, such as a command from the eNodeB or some other specific event. Examples of such events are the D2D link falling out of sync, or observation of higher block error rate (BLER) on received transport blocks.

Figure 6:
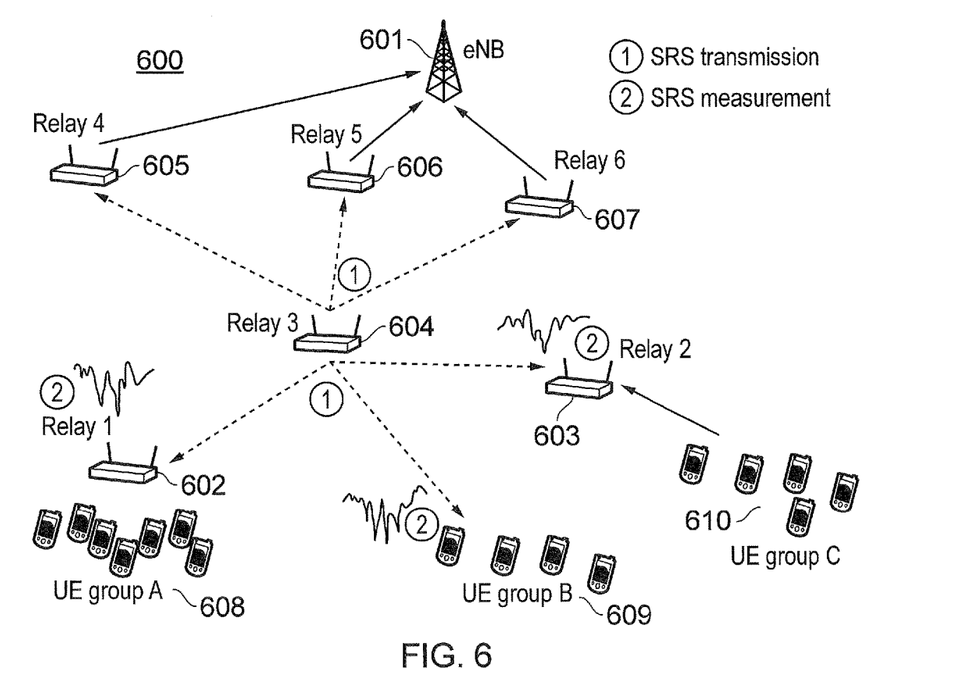
FIG. 6 illustrates an example of channel sounding in a dense relay network in accordance with the present technique.
Figure 7:
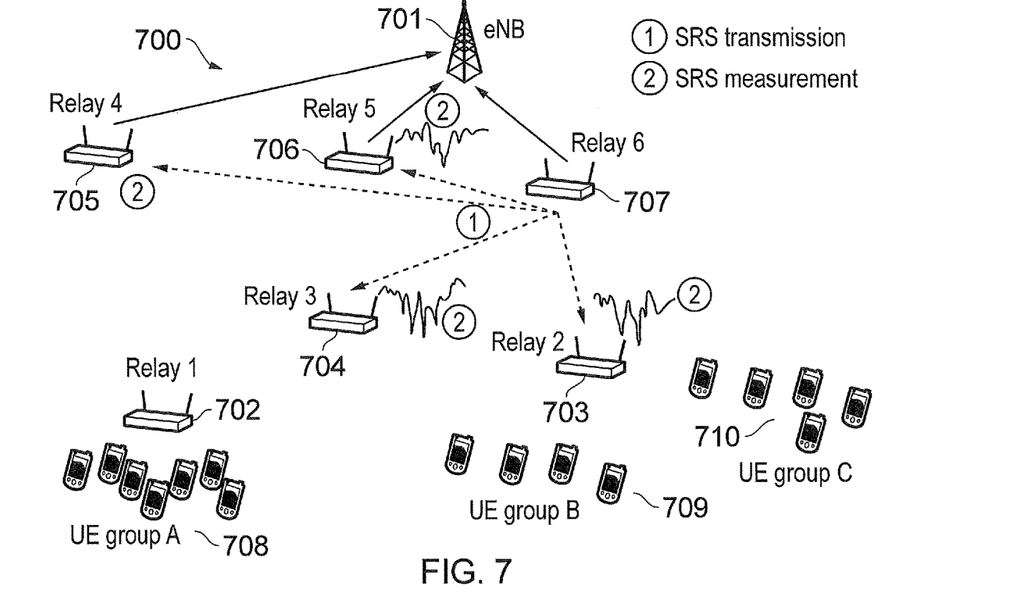
FIG. 7 illustrates another example of channel sounding in a dense relay network in accordance with the present technique.

FIGS. 6 and 7 illustrate two examples of channel sounding in a dense relay network, from two different relay nodes in the network, in accordance with an arrangement of the present disclosure.

FIG. 6 shows a mobile communications network 600, comprising an eNodeB 601, six relay nodes 602 to 607, and three clusters of UEs 608 to 610. UE group A 608 communicates with the first relay node 602, UE group B 609 communicates with the third relay node 604, and UE group C communicates with the second relay node 603. In this example, the third relay node 604 transmits a channel sounding signal which is detected and measured by all of the infrastructure units that it has links with, according to the look-up table that it previously received from the eNodeB 601. In this case, the infrastructure units which receive the channel sounding signal transmission from the third relay node 604 are all of the other relay nodes 602, 603 and 605 to 607 in the network, as well as UE group B 609. Each of these infrastructure units will then carry out a measurement of the received channel sounding signal, in order to estimate a state of the channel between themselves and the third relay node 604.

FIG. 7 shows a mobile communications network 700, comprising an eNodeB 701, six relay nodes 702 to 707, and three clusters of UEs 708 to 710. In this example, the sixth relay node 707 transmits a channel sounding signal which is detected and measured by all of the infrastructure units that it has links with, according to the look-up table that it previously received from the eNodeB 607. In this case, the infrastructure units which receive the channel sounding signal transmission from the sixth relay node 707 are the second relay node 703, the third relay node 704, the fourth relay node 705 and the fifth relay node 706. The eNodeB 701 determined that the communications path between the sixth relay 707 and the first relay 702 was not of a sufficient quality to be included in the look-up table received by the sixth relay 707, and so the sixth relay 707 will not listen to and measure the channel sounding signal transmitted by the first relay 702. Additionally, there is no communications link between the sixth relay 707 and any of the three UE clusters 708 to 710. Each of the infrastructure units which received the channel sounding signal however, will then, as in the example of FIG. 6, carry out a measurement of the received channel sounding signal, in order to estimate a state of the channel between themselves and the sixth relay node 707.

In a centrally coordinated embodiment, the eNodeB, after it has set up the look-up tables, signals the look-up tables to the relay nodes, and in addition signals the time instants of SRS transmissions for the relay nodes. For periodic SRS transmissions, each relay node would be assigned a pattern of time instants when it transmits SRS. Simultaneous transmission of SRS by multiple devices could in principle take place in an analogous fashion to the phase rotation and frequency comb used in single-carrier frequency-division multiple access (SC-FDMA), but the phase rotation requires very good synchronisation of signals. The challenge in D2D transmission is that there is not a single receiving entity (the eNodeB) that forces time alignment of received signals. Thus, in a practical embodiment, frequency multiplexing and separate time instants for SRS transmission may be the best solution.

For aperiodic SRS transmissions, an approach similar to existing LTE may be considered where the transmission time instant is configured by higher-layer signalling. There is an additional challenge in D2D scenarios in that multiple devices are expected to measure the aperiodic SRS transmission. Thus, all of those devices that potentially would be interested in the aperiodic SRS from a first device would need to be configured by higher-layer signalling.

Clearly, not all of the SRS transmission instants are relevant to all other devices. For example, a first relay node would only listen to the SRS transmission occasions when a second relay node in its outgoing edge is transmitting SRS (this second relay node is a destination for transmissions from the first relay node).

The channel sounding will have to take place often enough to provide a reasonably good estimate of the channel frequency response for scheduling purposes. This periodicity can be set as a system parameter that the network sets and communicates to the relay nodes. The fact that all of the relay nodes under the serving cell are synchronised with the serving base station allows the use of methods such as System Frame Number (SFN) for assigning the timings for each relay node to transmit SRS over the D2D frequency band.

Figure 8:
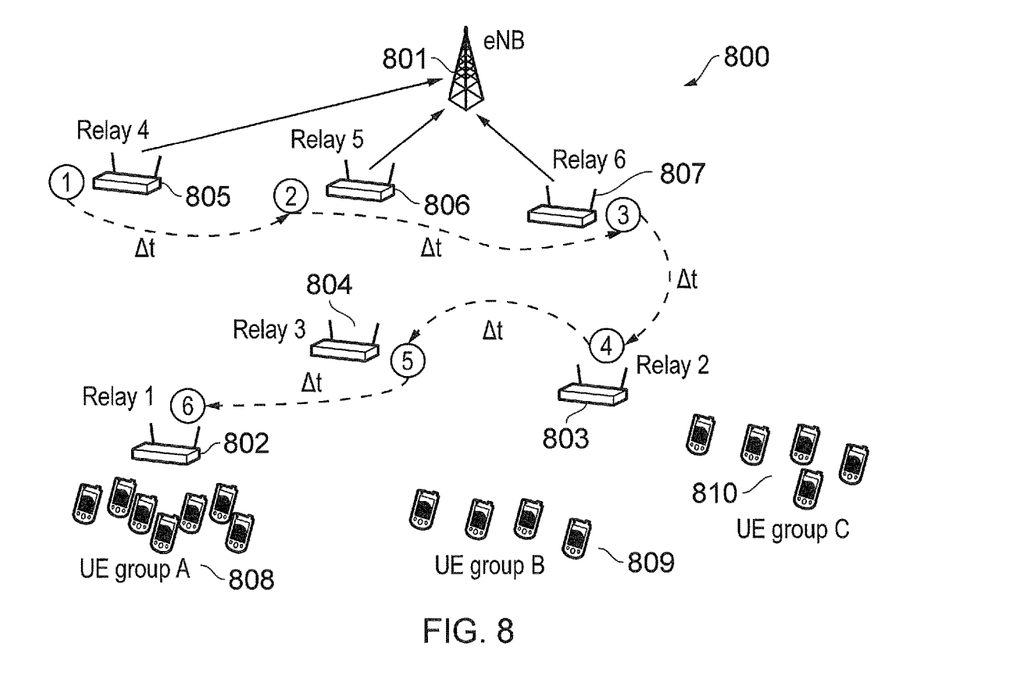
FIG. 8 illustrates an example of a sequential process for relay nodes transmitting channel sounding signals in accordance with the present technique.

FIG. 8 shows an example mobile communications network 800 in accordance with an arrangement of the present disclosure, comprising an eNodeB 801, six relay nodes 802 to 807, and three clusters of UEs 808 to 810. In this example, the relay nodes 802 to 807 transmit their channel sounding signals sequentially. The fourth relay node 805 is the first to transmit a channel sounding signal, which is received by all of the infrastructure units that it has a communications link to. These infrastructure units then carry out a measurement of the received channel sounding signal, in order to estimate a state of the channel between themselves and the fourth relay node 805. After a specified period of time Δt has elapsed, the next relay node, which in this example is the fifth relay node 806 transmits a channel sounding signal, which is received by all of the infrastructure units that it has a communications link to. Again, these infrastructure units then carry out a measurement of the received channel sounding signal, in order to estimate a state of the channel between themselves and the fifth relay node 806. This process continues for the sixth relay node 807, the second relay node 803, the third relay node 804 and finally the first relay node 802, until all relay nodes which serve the eNodeB 801 have transmitted their channel sounding signals.

Figure 9:
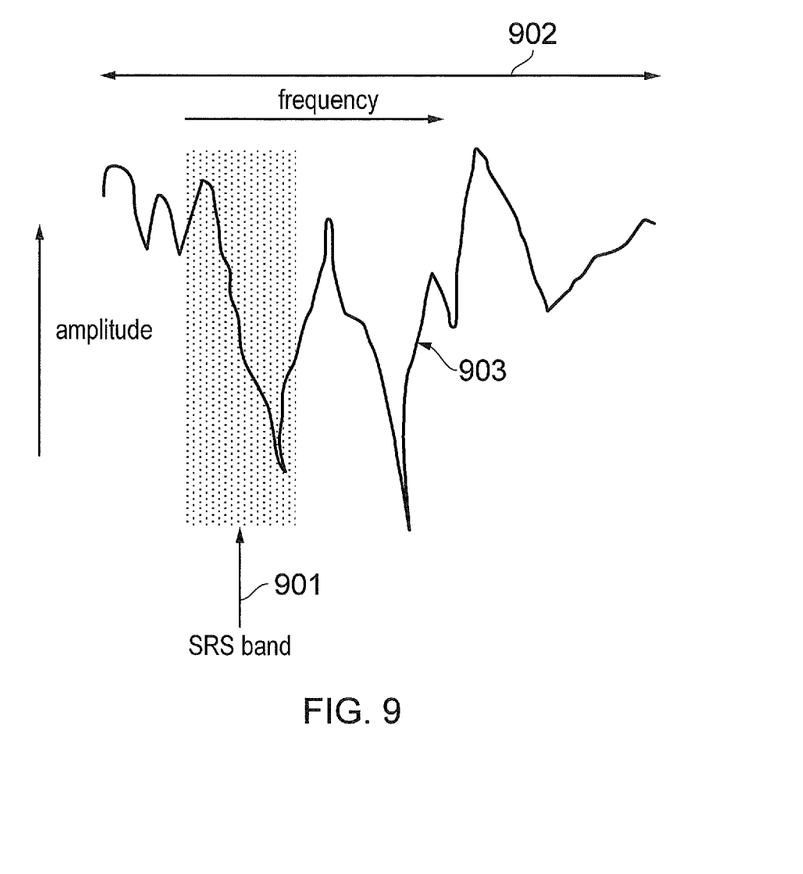
FIG. 9 illustrates the concept of a bandwidth sweep using channel sounding signals in accordance with the present technique.

In some embodiments, the sounding reference symbols may cover the complete D2D bandwidth, in which case the receiver can estimate the channel state with one measurement. In other embodiments, however, the sounding reference symbols may be transmitted only across a narrower portion of the band. Further transmissions allow the sweep of the complete frequency band. FIG. 9 illustrates an example of the case where the SRS transmitted only cover a part of the total D2D bandwidth. The x-axis is frequency and the y-axis is amplitude, and as seen, the SRS band 901 is smaller than the D2D bandwidth 902 as a whole. As a consequence, a number of SRS transmissions must be carried out in order to build up a channel sounding profile 903 for the entire D2D bandwidth.

In the centralised embodiment, the eNodeB may set a schedule for the relay nodes under its serving cell to send sounding reference signals between D2D connections. This may be, for example, a field in the look-up table, including the SFN and periodicity, or a separate RRC message, including the SFN and periodicity.

The schedule may also include information on how the scanning of the D2D frequency band is done. As described previously, this may be, for example, a single wide-band SRS during one transmission occasion, or a frequency band sweep with a narrow-band SRS (over a number of transmission occasions).

Figure 10:
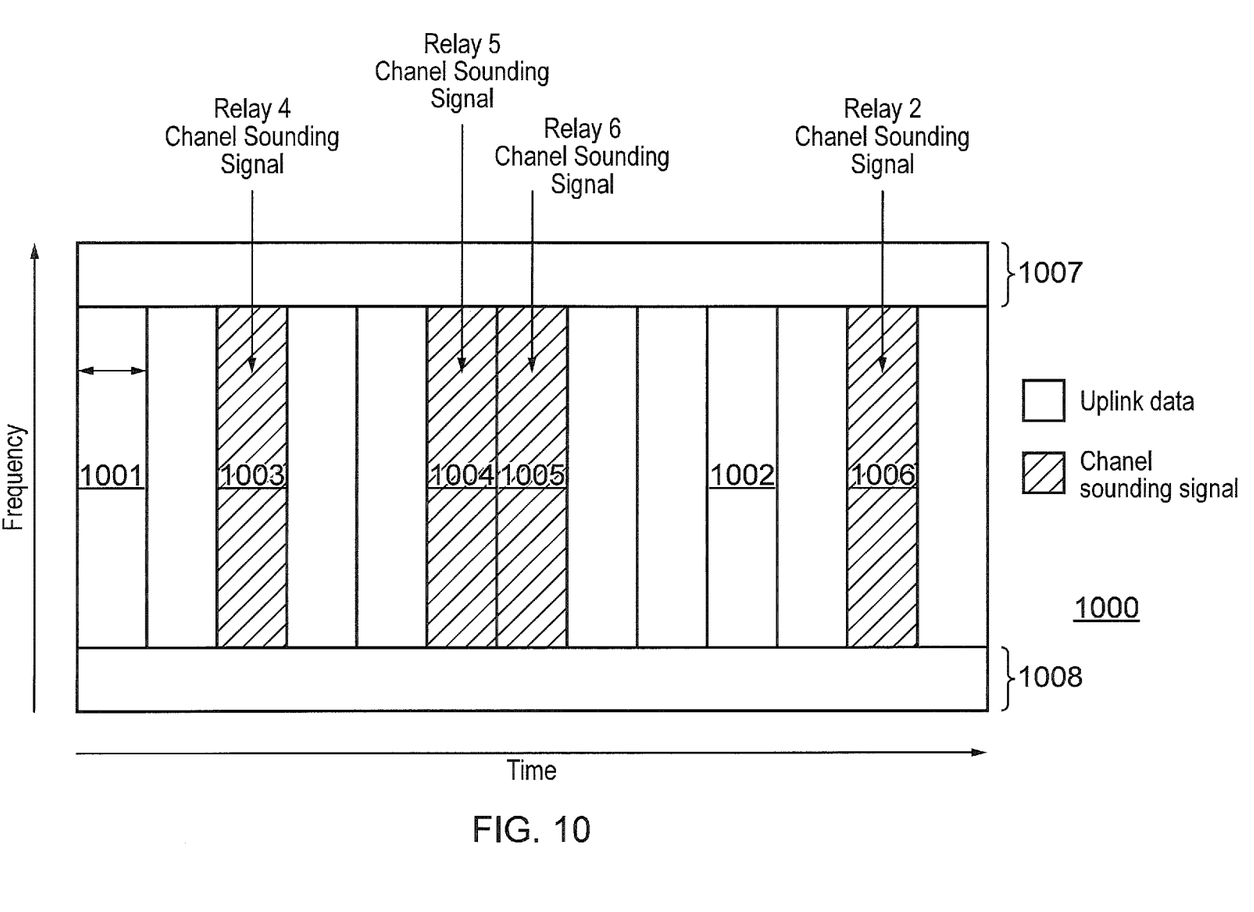
FIG. 10 illustrates an example time frame in which relay nodes transmit channel sounding signals in accordance with the present technique.

FIG. 10 illustrates an example uplink time frame 1000 in which relay nodes are scheduled to transmit their channel sounding signals. The frame 1000 is divided into a plurality of time slots 1001, which constitutes the communications resources that the controller is able to assign. In some of these time slots 1002, uplink data may be transmitted as normal by the UEs and relay nodes in the network. In some other of these time slots 1003 to 1006 however, uplink transmissions may be reserved for a single relay node to transmit a channel sounding signal to all infrastructure units that it has been assigned connections to.

For example, following the example relay node order of FIG. 8, but with channel sounding signals being transmitted aperiodically, in the third time slot 1003, the fourth relay is configured to transmit its channel sounding signal. This is followed in the sixth 1004 and seventh time slots 1005 by the fifth and sixth relay nodes respectively transmitting their channel sounding signals. Later, in the twelfth time slot 1006, the second relay node transmits its channel sounding signal.

An upper region 1007 and a lower region 1008 of sub-carriers/frequencies/resource blocks of the uplink frame 1000 are reserved for control signalling.

In the present disclosure, the term infrastructure unit aims to refer to any network node in the radio access network which can be found on the part from a source terminal (excluded) to a base station (included). It is noteworthy that although conventional terminals operating in a legacy network are unlikely to be considered as an infrastructure unit, in some examples, such as in some D2D cases, a terminal may sometimes be considered as an infrastructure unit, for example if it relays data or transmissions from other terminals to a base station (directly or indirectly). This term can thus include a base station for a macrocell, a base station for a small cell, a femtocell, a picocell, a relay node (operating in uplink and/or downlink), a terminal providing connectivity to one or more further terminals, etc.

As used herein, transmitting information or a message to an element may involve sending one or more messages to the element and may involve sending part of the information separately from the rest of the information. The number of "messages" involved may also vary depending on the layer or granularity considered.

In accordance with the present disclosure, when an uplink only relay node relays uplink signals, it may transmit relayed signals to the base station via one or more nodes (where the relayed signals are based on the received first uplink signals). For example, the signals may be transmitted to the base station via one or more relay nodes where some or all of them may be operating in one of an uplink-only mode or an uplink-and-downlink mode.

It is noteworthy that even though the present disclosure has been discussed in the context of LTE, its teachings are applicable to but not limited to LTE or to other 3GPP standards. In particular, even though the terminology used herein is generally the same or similar to that of the LTE standards, the teachings are not limited to the present version of LTE and could apply equally to any appropriate arrangement not based on LTE and/or compliant with any other future version of an LTE or 3GPP or other standard.

Various further aspects and features of the present technique are defined in the appended claims. Various modifications may be made to the embodiments hereinbefore described within the scope of the appended claims. For example although LTE has been presented as an example application, it will be appreciated that other mobile communications systems can be used for which the present technique can be used.

REFERENCES

[1] 3GPP TR36.872 V12.1.0, "Small cell enhancements for E-UTRA and E-UTRAN—Physical Layer aspects", December 2013.
[2] Holma H. and Toskala A., "LTE for UMTS OFDMA and SC-FDMA Based Radio Access", John Wiley & Sons Limited, January 2010.
[3] 3GPP TR36.877 V1.0.0, "LTE Device to Device proximity services; User Equipment (UE) Radio Transmission and Reception", December 2014.

The invention claimed is:

1. A mobile communications network comprising a base station, one or more relay nodes, and one or more communications terminals, the base station comprising
    a transmitter configured to transmit signals with accordance with a wireless access interface to the one or more communications terminals, and to transmit signals via the wireless access interface to the one or more relay nodes, and
    a receiver configured to receive signals via the wireless access interface from the one or more communications terminals, and to receive signals via the wireless access interface from the one or more relay nodes, wherein the mobile communications network comprises
    a controller, configured in combination with the receiver
    to receive measurement information from the one or more relay nodes and from the one or more communications terminals,
    to identify from an analysis of the measurement information connections between any two of the one or more relay nodes, and the one or more relay nodes and the one or more communications terminals, in accordance with a quality of radio communications between the one or more relay nodes, and the one or more relay nodes and the one or more communications terminals represented by the measurement information, and
    to assign communications resources for each of the one or more relay nodes, in which each of the one or more relay nodes is configured to transmit a channel sounding signal, wherein the controller is configured in combination with the transmitter
    to transmit the indication of the connections between the one or more relay nodes and the one or more communications terminals to each of the one or more relay nodes, and
    to transmit to each of the one or more relay nodes the assigned communications resources for each of the one or more relay nodes to transmit the channel sounding signal, and to transmit to each of the one or more communications terminals the assigned communications resources for each of the one or more relay nodes to transmit the channel sounding signal.

2. A mobile communications network as claimed in claim 1, wherein the controller is configured to determine a transmission power to be associated with the channel sounding signal configured to be transmitted by each of the one or more relay nodes and to transmit to the one or more relay nodes the determined transmission power to be associated with the channel sounding signal configured to be transmitted by the each of the one or more relay nodes.

3. A mobile communications network as claimed in claim 2, wherein the transmission power to be associated with the channel sounding signal is based on a largest path loss between the each of the one or more relay nodes and any other relay node of the one or more relay nodes.

4. A mobile communications network as claimed in claim 1, wherein if the analysis of the measurement information indicates that there are no connections between one of the one or more relay nodes and any other relay node, or between the relay node and any of the one or more communications terminals, the controller is configured to not assign communications resources for the relay node for transmission of a channel sounding signal.

5. A mobile communications network as claimed in claim 1, wherein the communications resources for transmitting the channel sounding signal comprises at least one time unit in a time frame into which the wireless access interface is divided and the controller is configured to assign the time units in a periodic fashion.

6. A mobile communications network as claimed in claim 5, wherein the communications resources for transmitting the channel sounding signal comprise at least one time unit of the time frame into which the wireless access interface is divided and the controller is configured to assign the time units for each of the one or more relay nodes to sequentially transmit the channel sounding signal.

7. A mobile communications network as claimed in claim 5, wherein the network controller is configured, in combination with the transmitter of the base station
 to set a period to be used in accordance with the periodic assignment of the time units, and
 to transmit the period to each of the one or more relay nodes.

8. A mobile communications network as claimed in claim 7, wherein the controller is configured to assign the communications resources of the wireless access interface in accordance with a number of each frame starting from a predetermined reference number, the number of each frame being a System Frame Number.

9. A mobile communications network as claimed in claim 1, wherein the communications resources for transmitting the channel sounding signal comprise at least one time unit of a time frame into which the wireless access interface is divided and the controller is configured to assign the time units in an aperiodic fashion.

10. A mobile communications network as claimed in claim 1, wherein the communications resources for transmitting the channel sounding signal comprises at least one time unit in a time frame into which the wireless access interface is divided and the controller is configured to assign the time units in response to an event in which there is a change in at least one of the one or more relay nodes.

11. A mobile communications network as claimed in claim 1, wherein the mobile communications network comprises more than one relay node, and communications resources for transmitting the channel sounding signal comprises at least one frequency unit in a frequency band into which the wireless access interface is divided.

12. A mobile communications network as claimed in claim 1, wherein the channel sounding signals cover a bandwidth equal to a bandwidth of the wireless access interface.

13. A mobile communications network as claimed in claim 1, wherein the channel sounding signals cover a bandwidth equal to a part of a bandwidth of the wireless access interface.

14. A relay node forming part of a mobile communications network, the relay node comprising
 a transmitter configured to transmit signals with accordance with a wireless access interface to one or more communications terminals, to transmit signals via the wireless access interface to one or more other relay nodes, and to transmit signals via the wireless access interface to a base station, and
 a receiver configured to receive signals via the wireless access interface from the one or more communications terminals, to receive signals via the wireless access interface from one or more other relay nodes, and to receive signals via the wireless access interface from the base station, wherein the relay node is configured
 to generate measurement information regarding link quality between the relay node and the one or more other relay nodes and link quality between the relay node and the one or more communications terminals,
 to transmit the measurement information to the base station, either directly or via one or more of the one or more other relay nodes,
 to receive from the base station, an indication of connections between the relay node and the one or more other relay nodes and an indication of connections between the relay node and the one or more communications terminals,
 to implement the indication of connections received from the base station to establish connections between the relay node and the one or more other relay nodes and the indication of connections between the relay node and the one or more communications terminals,
 to receive from the base station, communications resources in which to transmit a channel sounding signal, and
 to transmit the channel sounding signal in the assigned communications.

15. A relay node as claimed in claim 14, wherein the relay node is configured to transmit the channel sounding signal across a bandwidth equal to the bandwidth of the mobile communications network.

16. A relay node as claimed in claim 14, wherein the relay node is configured
 to transmit the channel sounding signal across a bandwidth equal to a part of the bandwidth of the mobile communications network, and
 to scan a bandwidth equal to the bandwidth of the mobile communications network during a plurality of transmissions of channel sounding signals.

17. A relay node as claimed in claim 14, wherein the relay node being a first relay node, the relay node is configured
 to estimate a channel state using the channel sounding signal transmitted by one of the one or more other relay nodes, the one of the one or more other relay nodes being a second relay node,
 to determine a frequency band on which to transmit signals to and receive signals from the second relay node based on the estimation of the channel state using the channel sounding signal, and to communicate with the second relay node using the determined frequency band.

\* \* \* \* \*